United States Patent [19]
Jolley et al.

[11] Patent Number: 5,300,149
[45] Date of Patent: Apr. 5, 1994

[54] CEMENTITIOUS COMPOSITIONS CONTAINING HYDROCARBYLOXYALKYLENEOXYALKYLENECARBOXYLIC ACID OR SALT THEREOF

[75] Inventors: Scott T. Jolley, Mentor; Richard A. Denis, Chagrin Falls, both of Ohio

[73] Assignee: The Lubrizol Corporation, Wickliffe, Ohio

[21] Appl. No.: 853,380

[22] Filed: Mar. 18, 1992

[51] Int. Cl.$^5$ ................ C04B 24/04; C04B 24/06
[52] U.S. Cl. ................................. 106/810; 106/728
[58] Field of Search ............... 106/728, 810, 697, 708

[56] References Cited

U.S. PATENT DOCUMENTS 4,015,993  4/1977  Natsuume ..................... 106/728

FOREIGN PATENT DOCUMENTS 2507010  8/1975  Japan ........................... 106/728
0914531  3/1982  U.S.S.R. ....................... 106/728

Primary Examiner—Mark L. Bell
Assistant Examiner—Paul Marcantoni
Attorney, Agent, or Firm—Forrest L. Collins; James A. Cairns; Frederick D. Hunter

[57] ABSTRACT

The present invention is related to a composition comprising a cementitious material and a hydrocarbyloxyalkyleneoxyalkylenecarboxylic acid or a salt thereof. In one embodiment, the hydrocarbyloxyalkyleneoxyalkylenecarboxylic acid or salt thereof may be represented by the formula:

$$(R^1O(R^2O)_n(CH_2)_yCO_2)_xM$$

wherein $R^1$ is a hydrocarbyl group, $R^2$ is an alkylene group, n is at least 1, y is at least 1, M is hydrogen, or a metal cation, and x is the valence of M. A cured cementitious structure comprising the composition and optionally a gas is also disclosed. The cementitious structures exhibit increased freeze-thaw stability.

24 Claims, No Drawings

CEMENTITIOUS COMPOSITIONS CONTAINING HYDROCARBYLOXYALKYLENEOXYALKYLENECARBOXYLIC ACID OR SALT THEREOF

FIELD OF THE INVENTION

The invention relates to compositions comprising a cementitious composition and a method for maintaining flow properties of a cementitious composition containing a reduced amount of water.

BACKGROUND OF THE INVENTION

Cements are versatile materials used in buildings, support structures, highways, dams, airport runways, ceramics etc. Generally, cements comprise a cementitious material, additives and water. A mixture of the above-mentioned components is cured to yield a cementitious structure. Cementitious structures are considered durable and strong. These structures do, however, suffer from the effects of weathering. In particular, low temperatures cause water inside cement structures to freeze. The water expands, weakening the structure. Water content affects workability. Workability, that is, the flow properties of a cementitious composition, should be maintained in order to facilitate the forming of a structure.

It is, therefore, desired to improve the freeze-thaw stability of cementitious structures. It is also desired to reduce the water content and to make strong and durable cementitious compositions. Additionally, it is desired to maintain the workability of a cementitious composition even at reduced water levels.

U.S. Pat. No. 2,243,501 relates to waterproof concrete that may be obtained using relatively small quantities of water by mixing with the cement a water-soluble organic compound having at least 8 carbon atoms. Specifically suggested are the use of fat alcohols reacted with several molecules of ethyleneoxide. Also, various water-soluble reaction products of ethyleneoxide and a fatty acid, a fatty acid amide, fatty acid glycerides, and hydroxy fatty acids may be employed.

U.S. Pat. No. 3,923,717 relates to reduction of water demand of wet process Portland cement slurries shown by water-soluble salts of styrene-maleic anhydride copolymers.

U.S. Pat. No. 3,955,994 relates to cementitious structures characterized by improved durability and weather resistance obtained by: incorporating alkyl and alkenyl acids, their anhydrides, acid esters, acid amides, halogenated compounds and salts, into cementitious prior to setting; applying said succinic compounds onto concrete subsequent to setting; or by a combination of the foregoing steps.

U.S. Pat. No. 4,046,582 relates to a cement composition comprising a cement and an air entraining water reducing agent for the cement, comprising as an active ingredient a higher secondary alcohol oxyalkylene sulfate.

U.S. Pat. No. 4,401,472 relates to a hydraulic cement mix including hydraulic cement, aggregate, sufficient water to effect hydraulic setting of the cement, and an additive comprising a poly(hydroxyalkylated) polyethyleneamine or a poly(hydroxyethyl)polyethyleneimine or mixtures of each or both, the additive being present in an amount sufficient to increase the compressive strength of the hardened mix.

U.S. Pat. No. 4,519,842 relates to a hydraulic cement mix including hydraulic cement, aggregate, sufficient water to effect hydraulic setting of the cement, an additive comprising a poly(hydroxyalkylated) polyethyleneamine or a poly(hydroxyethyl)polyethyleneimine or mixtures of each of both, the additive being present in an amount sufficient to increase the compressive strength of the hardened mix.

U.S. Pat. No. 4,784,781 relates to oil based compositions comprising an oil and a multi-functional additive represented by the formula:

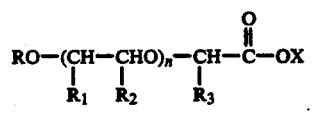

wherein R is a hydrocarbyl, $R_1$, $R_2$ and $R_3$ are independently hydrogen or alkyl, n is 1 to 20, and X is a cation. The additive is an effective EP agent and water tolerance fix in functional fluids and lubricating compositions.

Sandoz Product Bulletin 7-200/85 refers to a number of surfactant compounds sold under the trademark Sandopan. These compounds generally conform to the formula:

wherein R is a fatty group containing 13 to 18 carbons, n is 2 to 4, m is 1 to 100, $R_1$ is $CH_2$ to $C_3H_6$ and X is H or Na. These compounds are indicated as being useful end products such as cleaning fluids, cosmetics and toiletries.

SUMMARY OF THE INVENTION

The present invention relates to a composition, comprising: a cementitous material, water and hydrocarbyloxyalkyleneoxyalkylenecarboxylic acid or a salt thereof. Also, the present invention relates to cementitious structures prepared by the process comprising curing these compositions. The cured cementitious structure may additionally comprise a gas entrained therein.

Further, the present invention includes methods of increasing freeze-thaw stability and maintaining flow properties of a composition containing a reduced amount of water.

DETAILED DESCRIPTION OF THE PREFERRED EMBODIMENTS

The term "hydrocarbyl" is used herein to include substantially hydrocarbyl groups as well as purely hydrocarbyl groups. The description of these groups as being substantially hydrocarbyl means that they contain no non-hydrocarbyl substituents or noncarbon atoms which significantly affect the hydrocarbyl characteristics or properties of such groups relevant to their uses as described herein.

Examples of hydrocarbyl substituents which might be useful in connection with the present invention include the following:

(1) hydrocarbon substituents, that is, aliphatic (e.g., alkyl or alkenyl), alicyclic (e.g., cycloalkyl, cycloalkenyl) substituents, aromatic, aliphatic and alicyclic-substituents wherein the ring is completed through another portion of the molecule (that is, for example, any two indicated substituents may together form an alicyclic radical);

(2) substituted hydrocarbon substituents, that is, those substituents containing nonhydrocarbon radicals which, in the context of this invention, do not alter the predominantly hydrocarbon substituent; those skilled in the art will be aware of such radicals (e.g., halo (especially chloro and fluoro), alkoxy, mercapto, alkylmercapto, nitro, nitroso, sulfoxy, etc.);

(3) hetero substituents, that is, substituents which will, while having predominantly hydrocarbyl character within the context of this invention, contain other than carbon present in a ring or chain otherwise composed of carbon atoms. Suitable heteroatoms will be apparent to those of ordinary skill in the art and include, for example, sulfur, oxygen, nitrogen and such substituents as, e.g., pyridyl, furanyl, thiophenyl, imidazolyl, etc., are exemplary of these hetero substituents.

In general, no more than about three radicals or heteroatoms and preferably no more than one, will be present for each 10 carbon atoms in the hydrocarbon-based substituents. Typically, there will be no such radicals or heteroatoms in the hydrocarbon-based substituent and it will, therefore, be purely hydrocarbon.

The term "cementitious material" refers to cement compositions. Generally, a cement is any substance that acts as a bonding agent for materials, or any substance that is set and hardened by the action of water. Nonlimiting examples of a cementitious material include the following: cement, hydraulic cement, Portland cement, gas entrained cement, concretes, mortars, plasters and grouts. This list is intended to be merely illustrative and not exhaustive, and the omission of a certain class of cement is not meant to require its exclusion.

In one embodiment, the cementitious material includes aggregate. The term "aggregate" as used in the specification and claims is intended to include solid particles having a range of sizes including fine particles such as sand to relatively coarse particles such as crushed stone, gravel or slag.

The present inventors have discovered that cementitious compositions, containing a hydrocarbyloxyalkyleneoxyalkylenecarboxylic acid or a salt thereof, have increased freeze-thaw stability and/or maintain their flow properties even at a reduced water content.

In one embodiment, the hydrocarbyloxyalkyleneoxyalkylenecarboxylic or salt thereof of the composition is represented by the general formula:

$(R^1O(R^2O)_n(CH_2)_yCO_2)_xM$ wherein $R^1$ is a hydrocarbyl group, $R^2$ is an alkylene group, n is at least 1, y is at least 1, M is hydrogen or a metal cation, and x is the valence of M.

In the general formula, $R^1$ is a hydrocarbyl moiety within the hydrocarbyloxy group of the hydrocarbyloxyalkyleneoxyalkylenecarboxylic acid or salt thereof. In one embodiment, $R^1$ comprises at least about 6 carbon atoms. In another embodiment, $R^1$ comprises up to 50 carbon atoms. $R_1$ may be a hydrocarbyl moiety as defined below.

In one embodiment of the hydrocarbyloxyalkyleneoxyalkylenecarboxylic acid or salt thereof, the hydrocarbyl moiety comprises at least about 6, or about 8, or about 10 carbon atoms. The hydrocarbyl moiety comprises up to about 50, or to about 40, or to about 30 carbon atoms. Preferred hydrocarbyl moieties and $R_1$ groups are $C_{12-22}$ linear alkyl and $C_{10-18}$ branched alkyl groups. Some specific examples of the hydrocarbyl moiety and $R_1$ groups are stearyl, lauryl, oleyl, octylphenyl, nonyl, cetyl, tridecyl and isostearyl groups.

As described above, the number of carbon atoms in the hydrocarbyl moiety of a particular molecule is an integer. However, it should be noted that in any given sample containing numerous molecules, the number of carbon atoms may vary from molecule to molecule. Therefore, in a sample, the number of carbon atoms may represent the average number of carbon atoms in the hydrocarbyl moiety of all molecules of that sample. For example, a sample wherein the hydrocarbyloxy groups contain 16 to 18 carbon atoms may comprise an average of about 17 carbon atoms. In one embodiment above described hydrocarbyl group have an average carbon atom number with the same numerical ranges listed above, i.e., an average of greater than 6 carbon atoms, etc.

The hydrocarbyloxyalkyleneoxyalkylenecarboxylic acid or salt thereof may contain an average from about 1 to about 30 alkyleneoxy groups. In one embodiment the hydrocarbyloxyalkyleneoxyalkylenecarboxylic acid or salt thereof contains an average from about 2, or about 3 to about 20, or to about 6 alkyleneoxy groups per molecule. In the general formula above, n indicates the number of alkyleneoxy groups for a particular molecule. In one embodiment, n is at least about 1. Generally, n is an average of at least about 2, or about 3 to about 30, or to about 20, or to about 6.

It should be pointed out that in any given sample containing numerous molecules, the number of alkyleneoxy groups varies from one molecule to the next resulting in an average number of alkyleneoxy groups per sample of molecules. Accordingly, a sample may result wherein the number of alkyleneoxy groups, or n, is not a whole number, e.g., n is 4.5.

The alkyleneoxy group contains an alkylene group. Examples of alkylene groups are methylene, ethylene, propylene, butylene, pentylene, hexylene, heptylene, octylene and nonylene groups. Preferably, the alkylene group is a ethylene, propylene or a butylene group. In the general formula above, $R^2$ may be any alkylene group described herein. In one embodiment, $R^2$ comprises from 2 to about 4 carbon atoms.

In the hydrocarbyloxyalkyleneoxyalkylenecarboxylic acid or salt thereof, the alkylene moiety is defined above. In one embodiment the alkylene moiety comprises at least one carbon atom. In another embodiment, the alkylene moiety comprises up to about 4 carbon atoms. For instances, the alkylenecarboxylic acid moiety of the hydrocarbyloxyalkyleneoxyalkylenecarboxylic acid or salt thereof may be a methylenecarboxylic (acetic) acid moiety, ethylenecarboxylic (propanoic) acid moiety, propylenecarboxylic (butanioc) acid moiety, or butylenecarboxylic (pentanoic) acid moiety.

In the general formula above, y is at least 1. In one embodiment, y is at most about 4. In another embodiment, y is 1 to 3.

It should be recognized that when the hydrocarbyloxyalkyleneoxyalkylenecarboxylic acid is added to an alkaline cementitious material, the acid will form a salt in situ.

The hydrocarbyloxyalkyleneoxyalkylenecarboxylic acid or salt thereof may be an acid. Alternatively, it may be a metal salt. The metal may be an alkali metal, alkaline earth metal or transition metal. Examples of metals include sodium, potassium, magnesium, calcium, barium, titanium, manganese, copper and zinc; or sodium, barium calcium, magnesium and zinc; or calcium and magnesium. M in the general formula above includes hydrogen, or a metal cation of the metals listed herein.

Some examples of the hydrocarbyloxyalkyleneoxyalkylenecarboxylic acids and salts include: isotearyl—O—$(CH_2CH_2O)_5CH_2CO_2Na$; lauryl—O—$(CH_2CH_2O)_{2.5}$—$CH_2CO_2H$; lauryl—O—$(CH_2CH_2O)_{3.3}CH_2CO_2H$; oleyl—O—$(CH_2CH_2O)_4$—$CH_2CO_2H$; lauryl—O—$(CH_2CH_2O)_{4.5}CH_2CO_2H$; lauryl—O—$(CH_2CH_2O)_{10}CH_2CO_2H$; lauryl—O—$(CH_2CH_2O)_{16}$—$CH_2CO_2H$; octylphenyl—O—$(CH_2CH_2O)_8CH_2CO_2H$; octylphenyl—O—$(CH_2CH_2O)_{19}CH_2$—$CO_2H$; and 2-octyldecanyl—O—$(CH_2CH_2O)_6CH_2CO_2H$. In one embodiment, the hydrocarbyloxyalkyleneoxyalkylenecarboxylic acid or salt thereof is a stearylpentaethyleneglycolacetic acid or a salt thereof, preferably it is a isostearylpentaethyleneglycolacetic acid or a salt thereof. Some of these acids are available commerically from Sandoz Chemical under the tradename Sandopan Acids.

One method for preparing the neutral salts of hydrocarbyloxyalkyleneoxyalkylenecarboxylic acid involves heating a mineral oil solution of an acid with a stoichiometric amount of a metal neutralizing agent such as a metal oxide, hydroxide, carbonate, bicarbonate or sulfide at a temperature above 30° C. and filtering the resulting mass. Other methods known to those skilled in the art may be employed.

In the following examples, as well as elsewhere in the specification and claims, parts and percentages are by weight, temperature is in degrees celsius, and pressure is atmospheric pressure. The following examples relate to hydrocarbyloxyalkyleneoxalkylenecarboxylic acids and salts useful in the present invention.

EXAMPLE 1

A reaction vessel is charged with 210 parts of isostearyl pentaethylene glycolacetic acid, 20 parts of zinc oxide and 100 parts of toluene. The mixture is heated to 100° C. while removing 15 parts of water azeotropically. The reaction temperature is increased to 160° C. and maintained for 4 hours. The reaction mixture is cooled to 120° C. and filtered through diatomaceous earth. The filtrate is vacuum stripped to 120° C. and 20 millimeters of mercury. The residue is a zinc salt of the starting acid.

EXAMPLE 2

A reaction vessel is charged with 793 parts of a mixture of compounds encompassed by generally structural formula I wherein x is sodium, n is 5, $R_1$, $R_2$ and $R_3$ are hydrogen and are containing $C_{16-18}$ carbon atoms and may be branched or straight, and 300 parts of toluene. The mixture is cooled to 80° C. where 84 parts of calcium chloride dissolved in 80 parts water is added to the reaction mixture. The mixture is heated to 100° C. and 80 milliliters of water is removed azeotropically. The reaction mixture is filtered through diatomaceous earth and the filtrate is a calcium salt.

The preparations of cementitious compositions are known to those skilled in the art. In one embodiment, the compositions of the present invention are prepared by adding a desired amount of the hydrocarbyloxyalkylenenoxyalkylenecarboxylic acid or salt thereof into water to be directly added to the cementitious material. Alternatively, the compound may be directly added to the cementitious material and water prior to curing.

The amount of the hydrocarbyloxyalkyleneoxyalkylenecarboxylic acid or salt thereof present in the composition is an effective amount to improve freeze-thaw stability, to improve workability and/or to reduce the water content of the composition. When added to the cementitious material and water, the hydrocarbyloxyalkyleneoxyalkylenecarboxylic acid or salt thereof is present in an amount between about 0.001% to about 5% by weight of the composition. Preferably, the compound will be present in the range from about 0.001% to about 3%, and most preferably, from about 0.01% to about 2%.

The amount of water employed in the composition of the present invention should be enough to provide suitable workability of the composition. Generally, the amount of water in the composition is less than about 70%, or less than about 50%, or less than about 40% by weight, or even less than about 30% by weight. In still yet another embodiment, the amount of water in the composition is less than about 20% by weight. Generally, cementitious compositions contain at least about 5%, or about 10% by weight water.

Optionally, a gas may be entrained into the composition. The gas is added before the cementitious compositions harden into a structure. The gas may be added by methods known to those skilled in the art. Uniformly distributed gas bubbles create voids in which water may accumulate. In these voids, water can expand when frozen without weakening the structure of the cured cementitious structure. The voids included into the composition promote durability and avoid freeze-thaw degradation. In other words, the air entrained composition exhibits increased strength of cured cementitious structures. Preferably, the gas entrained into the composition is air or carbon dioxide. Another method to improve the freeze-thaw stability of a cementitious structure is to reduce the amount of water required. A reduced amount of water inside cement decreases the amount of internal expansion due to freezing water within the cement.

The compositions of the present invention are mixed to form a cementitious mixture and cured into a hardened cementitious structure. Optionally, a gas may be added to the mixture before hardening. The hardened structures made from the composition of the present invention display improved freeze-thaw characteristics.

It is noted that the cementitious compositions of the present invention maintain their flow properties prior to hardening. The flow properties are maintained despite the reduced water content of the composition. Flow properties, that is, workability, relates to the moldability of the cementitious compositions.

It is within the scope of the invention to incorporate in the compositions prepared as herein provided, other additives known in the art for any purpose for which they are normally employed. Such other additives may, for example, be air entraining agents, fly ash, coloring agents, water repellents, or other strength enhancing admixtures and the like.

Table 1 demonstrates the improved freeze-thaw stability of compositions of the present invention. The three concrete samples include: silica gravel (about 160 g.), silica sand (about 107 g.), Portland cement (about 52.5 g.) and water (about 36 g.). The cement cubes are frozen at about −15° C. overnight and then thawed to room temperature over a 24 hour cycle. The freezing-thawing is done with the cubes submerged in a 3 percent NaCl solution. The control represents concrete as described in this paragraph. Composition (I) additionally contains about 30 ml of a 1% aqueous solution of calcium isostearylpentaethyleneglycolacetate included instead of 36 g. of water. Composition (II) contains about 28 ml of a 2% aqueous solution of calcium isostearylpentaethyleneglycolacetate instead of 36 g. of water.

TABLE 1

| Concrete Sample | Number of Freeze-thaw Cycles Before Cracking Begins |
|---|---|
| Control | 2 |
| (I) | 12 |
| (II) | at least 20 |

The present invention has been disclosed and described herein in what is believed to be its preferred embodiments. However, modifications will occur to those skilled in the art upon reading this disclosure, and such modifications are intended to be encompassed by the present invention.

We claim:

1. A composition, comprising (A) a cementitious material, (B) water and (C) a hydrocarbyloxyalkyleneoxyalkylenecarboxylic acid or a salt thereof wherein (B) is present at from 5% to 70% and component (C) is present at from 0.01% to about 5% by weight of the composition.

2. The composition of claim 1 wherein the hydrocarbyloxy group of (C) comprising about 6 to about 50 carbon atoms.

3. The composition of claim 2 wherein the hydrocarbyloxy group of (C) is an stearyloxy, lauryloxy, oleyloxy or octylphenyloxy group.

4. The composition of claim 1 wherein (C) contains an average from about 2 to about 30 alkyleneoxy groups.

5. The composition of claim 1 wherein (C) contains an average from about 2 to about 20 alkyleneoxy groups.

6. The composition of claim 1 wherein (C) is a hydrocarbyloxyalkyleneoxyacetic acid, -propanoic acid, -butanoic acid or -pentanoic acid or salt thereof.

7. The composition of claim 1 wherein (C) is represented by the formula:

$$(R^1O(R^2O)_n(CH_2)_yCO_2)_xM$$

wherein $R^1$ is a hydrocarbyl group, $R^2$ is an alkylene group, n is at least 1, y is at least 1, M is hydrogen, or a metal cation, and x is the valence of M.

8. The composition of claim 7 wherein $R^1$ is an alkyl or alkenyl group containing from 6 to about 50 carbon atoms, $R^2$ is an alkylene group containing from 2 to about 4 carbon atoms, n is an average of 2 to about 30, and y is 1 to about 6.

9. The composition of claim 1 wherein (C) isostearylpentaethylene glycol acetic acid or a salt thereof.

10. The composition of claim 1 wherein (C) is an alkali or alkaline earth metal salt.

11. The composition of claim 1 wherein (C) is a sodium, calcium or magnesium salt.

12. The composition of claim 1 containing less than about 40% water.

13. The composition of claim 1 wherein the cementitious material (A) is a Portland cement.

14. A composition, comprising (A) a cementitious material; (B) water; and (C) from 0.001 to about 5% by weight of a hydrocarbyloxyalkyleneoxyalkylenecarboxylic acid or salt thereof.

15. The composition of claim 14 wherein the hydrocarbyloxy group of (C) is a stearyloxy, lauryloxy, or oleyloxy group and wherein (C) contains from 1 to about 30 alkyleneoxy groups.

16. The composition of claim 14 wherein (C) is represented by the formula:

$$(R^1O(R^2O)_n(CH_2)_yCO_2)_xM$$

wherein $R^1$ is an alkyl or alkenyl group having from 6 to about 50 carbon atoms, $R^2$ is an alkylene group containing 2 to about 4 carbon atoms, n is from 1 to about 30, y is 1 to about 4, M is hydrogen, a metal cation, and x is a valence of M.

17. The composition of claim 14 wherein (C) is a alkali or alkaline earth metal salt.

18. The composition of claim 14 containing less than 40% water.

19. A cementitious structure, prepared by a process comprising (1) preparing the composition of claim 1, (2) curing the composition to form the cementitious structure.

20. The structure of claim 19 wherein the composition to form the comprises a gas prior to curing.

21. The structure of claim 20 wherein the gas is air or carbon dioxide.

22. A method of improving freeze thaw stability of a cementitious structure comprising the steps of preparing the composition of claim 1, and curing the composition into the cementitious structure.

23. The composition of claim 1 additionally comprising a gas.

24. The composition of claim 14 additionally comprising a gas.

* * * * *